United States Patent [19]

Flemming et al.

[11] Patent Number: 5,247,608
[45] Date of Patent: Sep. 21, 1993

[54] METHOD AND APPARATUS FOR ACHIEVING DYNAMIC PATH CONTROL OF MULTIPLE ROBOTS

[75] Inventors: John P. Flemming, Princeton; Glenn C. Van Orden, Trenton, both of N.J.

[73] Assignee: AT&T Bell Laboratories, Murray Hill, N.J.

[21] Appl. No.: 677,906

[22] Filed: Apr. 1, 1991

[51] Int. Cl.$^5$ .......................... G06F 9/00; G05D 1/02
[52] U.S. Cl. ....................................... 395/90; 395/83; 364/461
[58] Field of Search ................ 395/83, 90; 364/461; 318/587, 640

[56] References Cited

U.S. PATENT DOCUMENTS

| | | | |
|---|---|---|---|
| Re. 27,289 | 2/1972 | Sawyer | 318/38 |
| Re. 27,436 | 7/1972 | Sawyer | 346/29 |
| 3,669,206 | 6/1972 | Tax et al. | 318/587 |
| 4,028,533 | 6/1977 | Matsubara | 364/424.02 |
| 4,284,160 | 8/1981 | Deliban et al. | 318/587 |
| 4,644,237 | 2/1987 | Frushour et al. | 318/640 |
| 4,811,227 | 3/1989 | Wikström | 364/424.02 |
| 4,890,241 | 12/1989 | Hoffman et al. | 395/90 |
| 4,941,103 | 7/1990 | Kato | 395/83 |
| 4,998,050 | 3/1991 | Nishiyama et al. | 395/83 |
| 5,019,762 | 5/1991 | Kato | 395/83 |

Primary Examiner—Allen R. MacDonald
Assistant Examiner—George Davis
Attorney, Agent, or Firm—Robert B. Levy

[57] ABSTRACT

Dynamic control of the motion of a plurality of robots (12a and 12b) is accomplished by checking for interference if each robot were to traverse an incremental portion of its programmed path segment, the incremental portion being at least as long as the distance required for the robot to stop. Should there be no interference, each robot is allowed to traverse the incremental path length portion. Otherwise, the robot having the highest priority is enabled to reverse its incremental path segment portion while the other robots which would otherwise interfere are ordered to take evasive action, either to stop if moving, or to move away if stopped. Periodic checks are made for an interference condition at a sufficiently rapid rate so that each non-interfering robot can traverse successive incremental path segment portions in a smooth manner.

10 Claims, 3 Drawing Sheets

METHOD AND APPARATUS FOR ACHIEVING DYNAMIC PATH CONTROL OF MULTIPLE ROBOTS

TECHNICAL FIELD

This invention relates to a technique for dynamically controlling the path of each of a plurality of individual robots to avoid an interference between robots.

BACKGROUND OF THE INVENTION

Within the field of robotics, there now exist robots, sometimes referred to as robotic workstations, which have multiple manipulators, that is, multiple work-performing members, such as parts grippers for example, which are movable independent of each other. An example of such a multiple manipulator robotic workstation is the AT&T FWS 200 workstation, available from AT&T, Princeton, N.J., which is comprised of a frame that supports a ferromagnetic platen from which depends a pair of independently movable manipulators. Each manipulator includes a linear motor of the type disclosed in U.S. Pat. Nos. Re. 27,289, issued on Feb. 15, 1972, and Re. 27,436, issued on Jul. 18, 1972, to B. A. Sawyer (herein incorporated by reference), which serves to propel the manipulator on the platen along a rectilinear path. Depending from each manipulator is a z-axis actuator which carries a tool, e.g., a vacuum pickup, at its lowermost tip for performing an operation, such as a pick-and-place operation, on a workpiece situated on a work surface in spaced parallelism below the platen.

A common problem associated with multiple manipulator robots of the type described above is the possibility of an interference (e.g., a collision) between the manipulators as each moves along a particular path segment in the course of performing a designated operation. One possible approach to avoiding such an interference is to employ a semaphore, that is, an indicator, typically a numerical value, which signals when a particular manipulator occupies a region that can be occupied by the other manipulator. For example, in the above-described robot, the area on the platen overlying a workpiece, such as a circuit board, is one region which is common to both manipulators. For as long as either of the manipulators is occupying this common region, a semaphore corresponding to the region is accorded a non-zero value which is decremented to zero upon the manipulator leaving the region. Before the other manipulator can enter this common region, a check is made whether the associated semaphore is zero. Until the semaphore is zero, the manipulator which is to enter the region must wait until the manipulator currently occupying the region has left. This approach to avoiding an interference between manipulators is inefficient from the standpoint that as long as a manipulator occupies any part of a common region, the other manipulator must wait before entering the region even if it could safely enter without the risk of an interference.

In U.S. Pat. No. 4,890,241, issued on Dec. 26, 1989, a slightly different scheme is proposed for avoiding interference between each of a pair of manipulators of a robotic workstation. As described in that patent, an interference is avoided between two manipulators by "allocating" (e.g., reserving) the entire rectilinear path traveled by the first one of the manipulators. While the path segment of this particular manipulator remains allocated, no other manipulator may travel across any part of the allocated path. Once the first manipulator has completed its travel along its allocated path, the path is de-allocated, making it available for travel by another manipulator. The disadvantage of this approach is that while a particular manipulator's path is allocated, every other manipulator must wait before crossing the path, even if such a crossing could be completed without incurring any interference. Like the previously described approach, this approach also incurs the disadvantage of being inefficient from the standpoint that manipulator movement must be halted to avoid an interference.

Thus, there is need for a technique for dynamically controlling the motion of multiple manipulators so as to avoid any interference between them.

SUMMARY OF THE INVENTION

Briefly, in accordance with a preferred embodiment of the invention, a technique is disclosed for achieving dynamic path control of each of a plurality of robots which are pre-programmed to execute a particular motion plan, i.e., to travel one or more path segments at a user-programmed velocity and acceleration. The technique is practiced by first assigning a priority to each robot to establish the order in which each executes a particular path segment in its motion plan relative to the other robots. Thereafter, the proximity of each robot to every other robot is checked, that is, the likelihood that each robot will interfere with the others when the robot travels an incremental portion of its current move (i.e., its presently traveled path segment). The length of the incremental path segment portion is selected to be at least equal to the distance required for the robot to stop, plus the distance that the robot would travel at its programmed speed and acceleration before a subsequent check can be made whether the robot will interfere with any of the others. Each robot which can travel its incremental path segment portion without interfering with the others is allowed to do so, and thus, each such robot, if already moving, is allowed to continue doing so, or if stationary, is allowed to start moving. If any robot would interfere with any other, the robot having the highest priority is allowed to continue moving, if in motion, or to start moving if at rest. A robot which would interfere with another and which has a lower priority is ordered to take evasive action. For example, the lower priority robot may be ordered either to stop moving, if already in motion, or if stopped, to move away from a higher priority robot. The steps of the above-described dynamic path control method are rapidly executed repeatedly so that if a robot is not found to interfere with any other along its entire path segment, that robot will traverse its path segment in an uninterrupted manner.

DETAILED DESCRIPTION

Figure 1:
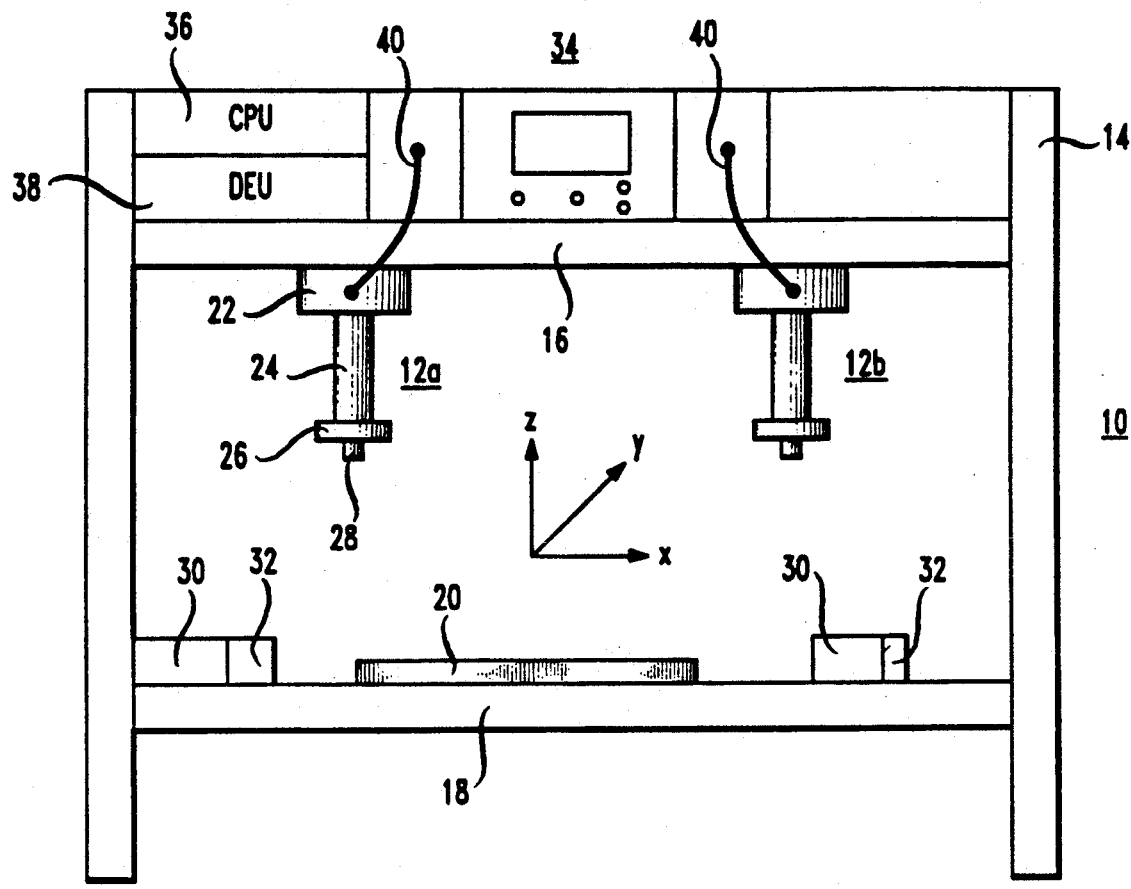
FIG. 1 is a front view of a multiple robot system according to the prior art.

Referring to FIG. 1, there is shown a front view of a system 10 comprised of at least two individual robots 12a and 12b. In a preferred embodiment, the system 10 takes the form of an AT&T model FWS 200 workstation and is comprised of a frame 14 that carries a platen 16 in spaced horizontal relationship above a shelf 18 for supporting at least one article 20 (e.g., a circuit board) on which at least one operation is carried out by at least one of the robots 12a and 12b. Although not shown, the undersurface of the platen 16 is etched with a first and second set of spaced grid lines which are perpendicular to each other.

In a preferred embodiment, each of the robots 12a and 12b is comprised of a forcer 22 within which is a "Sawyer-type" linear electric motor (not shown) which propels the forcer along a rectilinear path on the undersurface of the platen 16 in the manner described in the aforementioned U.S. Pat. Nos. Re. 27,289 and Re. 27,436. Depending from each forcer 22 is a z-axis actuator 24, typically pneumatic or electric, which is extensible along the z-axis to and from the forcer. At the lowermost tip of the z-axis actuator 24 is a work-performing member 26. In a preferred embodiment, the work-performing member 26 comprises a vacuum pickup to facilitate pickup of a component 28 and placement thereof on the circuit board 20. In the event that an operation other then component placement is to be carried out, a different type of work-performing member would be substituted for the vacuum pickup 26.

In the illustrated embodiment shown in FIG. 1, at least one parts feeder 30 is situated below the platen 16 within the path of travel of each of the robots 12a and 12b to feed a component 28 for pickup by the vacuum pickup 26 of a corresponding robot. Adjacent to each parts feeder 30 is an alignment nest 32. The alignment nest 32 serves to align a component 28, when placed therein by a corresponding one of the robots 12a and 12b. Aligning the component 28 prior to placement on the circuit board 20 assures that the component will be properly positioned for placement on the circuit board 20.

Control of each robot 12a and 12b (i.e., control of the robot's forcer 22, its z-axis actuator 24 and its vacuum pickup 26) is accomplished by a control system 34, typically mounted within the frame 14 above the platen 16. The control system includes a general purpose digital computer (CPU) 36, typically an AT&T model 6386 personal computer available from AT&T. Among its other functions, the CPU 36 serves to generate a stream of digital signals which specify the x and y acceleration and velocity of each robot 12a and 12b as well as the duration (distance) of the robot's movement along its rectilinear path in accordance with a motion plan programmed into the CPU by an operator at the outset of operation.

These digital signals specifying each robot's motion are input to a drive electronics unit (DEU) 38 which provides a stream of analog signals to the robot's forcer 22 through an umbilical cord 40 to excite the linear motor within each forcer in the manner described in the aforementioned reissue patents Re. 27,289 and Re. 27,436. In a preferred embodiment, the DEU 38 is manufactured by Xynetics, San Jose, Calif. In addition to carrying the analog signals to the forcer 22 of a corresponding one of the robots 12a and 12b, each umbilical cord 40 also carries electrical signals (or fluid) to control the robot's z-axis actuator 24. In addition, the umbilical cord 40 includes a tube (not shown) through which a vacuum is selectively drawn from the vacuum pickup 26 to facilitate pickup and release of the component 28.

As indicated, at the outset of operation, the CPU 36 is programmed by a user to cause each robot 12a and 12b to perform one or more operations, such as pickup and placement of a component 28 on the circuit board 20. In order for the robot 12a to pick up and place a component 28, the robot must be displaced first to the parts feeder 30, then to the alignment nest 32 and then to a location overlying the area on the circuit board 20 where the component 28 is to be placed. As may be appreciated, as each of the robots 12a and 12b traverses a rectilinear path along the platen 16, there is possibility that an interference may occur between robots. This may best be appreciated by reference to FIG. 2 which is an plan view looking upward at the undersurface of the platen 16. As the robot 12a, for example, moves along the platen 16 from a first position to a second position, the robot effectively sweeps out an area $a_1$. If the other robot 12b attempts to occupy any portion of the area $a_1$ at the same time as the robot 12a, an interference will occur.

Figure 2:
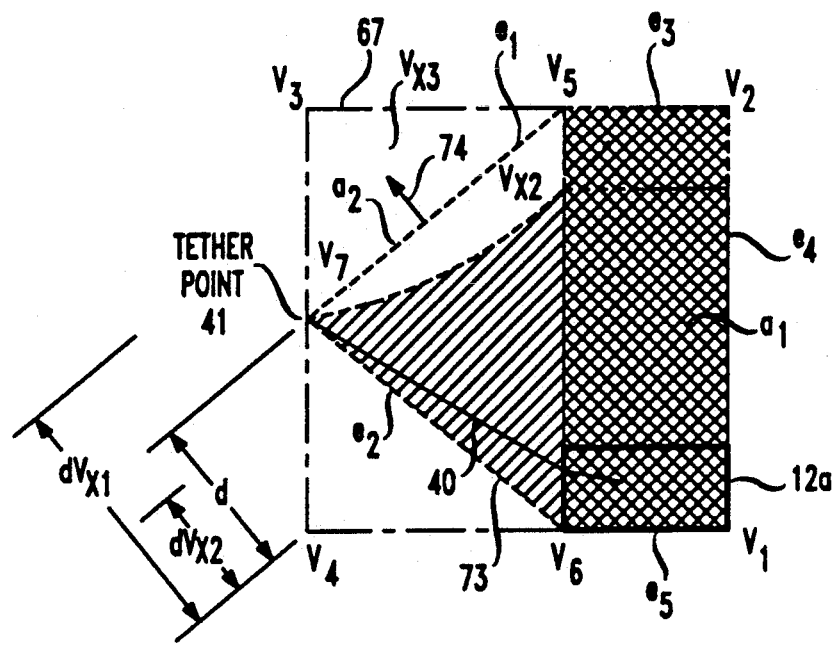
FIG. 2 is a plan view of the underside of a platen of the multiple robot system of FIG. 1.

In addition, an interference will likely occur if the robot 12b (see FIG. 1) attempts to cross the umbilical cord 40 associated with the robot 12a of FIG. 2. As the robot 12a moves, its associated umbilical cord 40 effectively sweeps out a pie-shaped area $a_2$, the vertex of this area being at a "tether point" 41 about which the umbilical cord tethers. Thus if the robot 12b of FIG. 1 attempts to occupy any portion of the area $a_2$, an interference is also likely.

Figure 3:
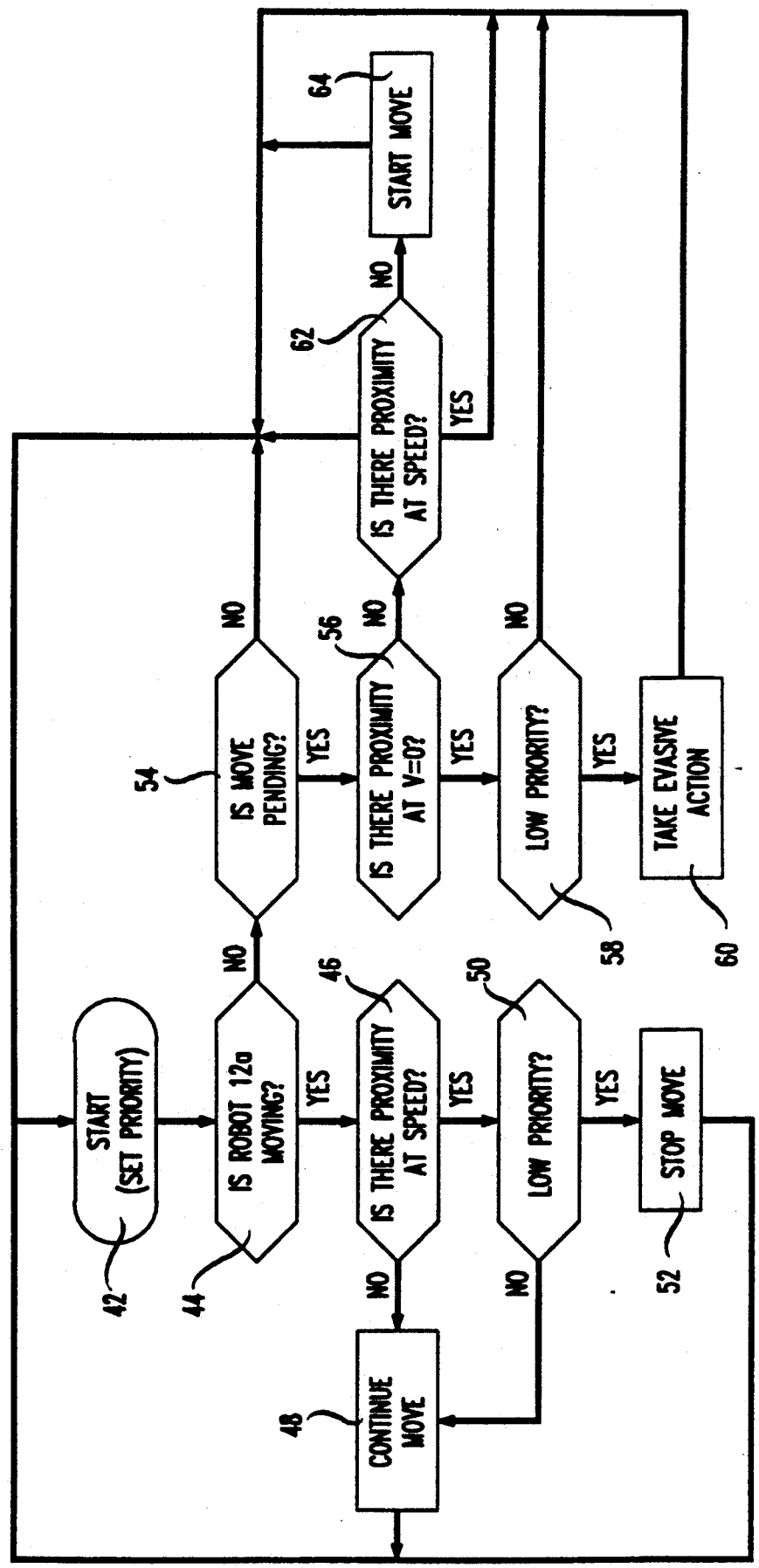
FIG. 3 is a flowchart illustrating the steps of the method of the invention for dynamically controlling the path of each of the robots of FIG. 1.

Referring to FIG. 3, there is shown a flowchart diagram of a method (implemented by a program within the CPU 36 of FIG. 1) for dynamically controlling the pre-programmed motion plan of the robot 12a. (The dynamic path control method of FIG. 3 is also executed to control the motion plan of the robot 12b.) Prior to the execution of the method of FIG. 3, the CPU 36 of FIG. 1 will have been programmed by an operator with the motion plan of the robot 12a, that is, the beginning and end points for each path segment to be traveled, as well as the robot velocity and acceleration during travel along that segment. Similar information will have also been programmed for the robot 12b.

The dynamic path control program of FIG. 3 is initiated by executing a start instruction (step 44), whereupon various internal fields (not shown) associated with the program are reset. In addition, the priority the robot 12a, that is, the order in which the robot will traverse a successive one of its path segments relative to the robot 12b, is also set. Thus, in the event of a deadlock where both robots 12a and 12b are programmed to occupy the same area, preference can be given to one of the robots in an orderly fashion.

The assignment of priority, that is, the process of designating which of the two robots 12a and 12b will move away from the other in the event of an imminent interference between them, can either be permanent or can be temporary depending on operating conditions.

For example, in certain circumstances the same one of the robots 12a and 12b will always be assigned a higher priority, as compared to the other robot, every time step 42 is re-executed. On the other hand, it may be desirable to reassign the priotities of the robots 12a and 12b depending on their positions at the time step 42 is being re-executed.

Following step 44, a check is made during step 46 whether the robot 12a is moving. As will be appreciated hereinafter, the dynamic path control method of FIG. 3 is executed repeatedly. So even though the robot 12a may not be moving now, during a successive execution of the dynamic path control program, a move grant, that is, an authorization allowing the robot 12a to move, may be issued subsequently so the robot 12 may indeed be moving thereafter. If the robot 12a is found to be moving during step 44, then a branch is made to step 46 whereupon a check is made if, in the future, the now-moving robot, when it has traveled a predetermined incremental portion of the programmed path segment (at the programmed speed and acceleration), would be proximate to (i.e., interfere with) the robot 12b. As will be described with respect to FIG. 4, the likelihood of an interference is determined by checking whether the area swept out by the robot 12a, once it has traveled the predetermined incremental path segment portion, would intersect any part of the area swept out by the robot 12b during travels along its current incremental path segment portion. For purposes of determining an interference, the incremental path segment portion is selected to be at least as great as the distance required for the robot 12a to come to a stop in order to avoid an interference, plus the distance that the robot would travel during the interval that would elapse before step 46 is re-executed to check for a subsequent interference.

Should the robot 12a not be found to be proximate the robot 12b during step 46 (i.e., there is no likelihood of an interference between the robots), then step 48 is executed and the current move of the robot 12a is allowed to continue. In other words, the robot 12a is allowed to travel its next incremental path segment portion. Following step 48, program execution branches back to step 42.

If, during step 46, the robot 12a is found to be proximate the robot 12b such that the robots would interfere if each were to traverse its next successive incremental path segment portion, then step 50 is executed and a comparison is made between the priority of the robots. Should the robot 12a have a higher priority, then step 48 is executed during which step an authorization is granted to permit this robot to traverse its next incremental path segment portion. Otherwise, the current move of the lower priority robot 12a is stopped, and thereafter, execution branches back to step 42.

The program steps thus far described are executed after a determination is made during step 44 that the robot 12a is currently moving. However, during step 44, the robot 12a may be at rest because the robot has yet to be issued a move authorization. If such is the case, then step 54 is executed whereupon a check is made whether a move is pending, that is, whether the robot 12a has additional moves to make (i.e., whether there are additional incremental portions of the robot's programmed path segment to travel). Should no move be found pending during step 54, then execution branches back to step 42.

Should a move for the robot 12a be pending during step 54, then step 56 is executed and a check is made whether the robot, while standing still (e.g., its velocity and acceleration are zero) is nonetheless proximate the robot 12b (i.e., an interference with that robot is imminent). In other words, during step 56, a determination is made whether the now-stationary robot 12a lies in the incremental path segment portion being traversed by the robot 12b. If the robot 12a is found proximate the robot 12b during step 56, then step 58 is executed, and a comparison is made between the priorities of the two robots. Should the robot 12a have a lower priority, then step 60 is executed and the robot is ordered to take evasive action (e.g., to move away from the robot 12b) to avoid an interference. In the event that the robot 12a has a higher priority, then program execution branches directly to step 42 without the robot 12a being issued a move authorization.

If, during step 56, the robot 12a, while standing still, is not found to be proximate to the robot 12b, then step 62 is executed. During step 62, a check is made whether the robot 12a would be proximate to the robot 12b (i.e., interfere with were the robot 12a to travel its next or pending incremental path segment portion at the programmed speed and acceleration. If the robot 12a would become proximate to (i.e., interfere with) the robot 12b under these circumstances, program execution branches to step 42. Thus, the robot 12a is not issued a move authorization. Otherwise, should the robot 12a be found capable of traveling its pending incremental path segment portion without interfering with the robot 12b, step 64 is executed and an authorization is granted for the robot 12a to traverse its next incremental path segment portion. Thereafter, step 42 is executed.

The above-described steps are re-executed very rapidly, usually at least once every 15 milliseconds for each of the robots 12a and 12b. The steps of FIG. 3 are executed first for the robot 12a and then for the robot 12b before repeating this sequence. If more than two robots 12a and 12b were to be controlled, the steps of the method would be executed in succession for each robot before repeating the sequence. Typically, the more rapidly these steps are re-executed, the shorter the length of the incremental portion of the path length that needs to be allocated to each of the robots 12a and 12b during steps 46 and 62. The overall speed of the CPU 36 will generally limit how fast the steps in the method of FIG. 3 can be executed. By repeatedly executing the steps of the dynamic path control method of FIG. 3 very rapidly, both of the robots 12a and 12b can be made to move in a smooth, uninterrupted fashion, assuming that each robot will not interfere with the other along its programmed path segment.

Figure 4:
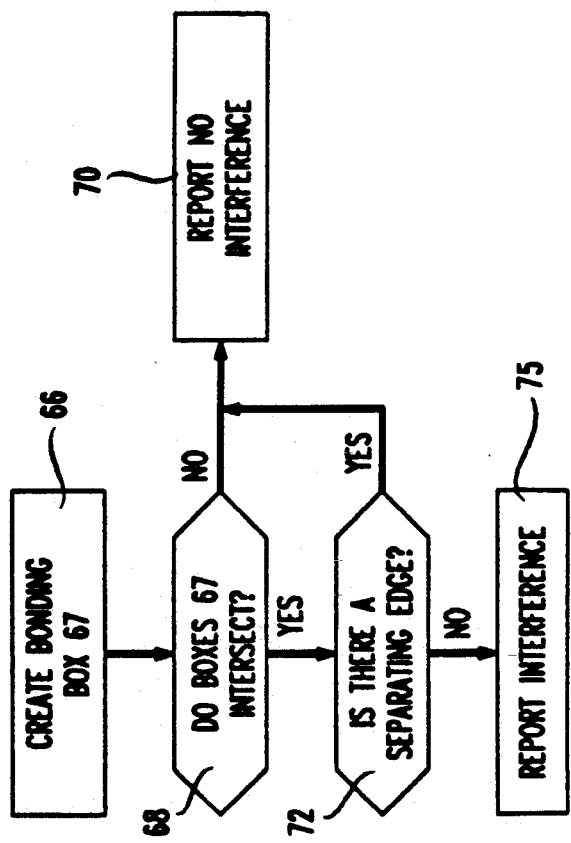
FIG. 4 is a flowchart of the steps of a method executed during the method of FIG. 3 for determining the likelihood of an interference between the robots of the system of FIG. 1.

Referring now to FIG. 4, there is shown, in flowchart form, the sub-steps which are executed during steps 46 and 62 of FIG. 2 to determine proximity, (i.e. the existence of interference) between the robots 12a and 12b. Immediately upon branching to the sub-routine of FIG. 4, step 66 is executed. During step 66, a bounding box 67 (see FIG. 2) is created to enclose a region containing both the area $a_1$ swept out by robot 12a, were it to traverse its incremental path length portion, and the area $a_2$ which would be swept out by the robot's umbilical cord 40. The bounding box 67 of FIG. 2 has four vertices $v_1$, $v_2$, $v_3$ and $v_4$, the first two vertices $v_1$ and $v_2$ being given by the two corners of the area $a_1$ which are furthest from the tether point 33. The other two vertices $v_4$ and $v_5$ each lie along a line which runs through the tether point 33 and which is parallel to the line connecting the vertices $v_1$ and $v_2$. The bounding box 67 can easily be established since the beginning and end points of the swept area $a_1$ are known along with the location of the tether point 33.

Following step 66 of FIG. 4, step 68 is executed and a check is made whether the bounding box 67 of FIG. 2, which is associated with the robot 12a, intersects the box (not shown) associated with the robot 12b. Should the boxes 67 not intersect, program execution branches to step 70 and a condition of "no interference" is reported (step 70). As may be appreciated, the lack of any intersection between the bounding boxes 67 associated with the robots 12a and 12b indicates that the area swept out by each robot does not intersect the area swept out by the other. Under such conditions, the robots 12a and 12b will not interfere.

While the absence of an intersection of the bounding boxes 67 associated with the robots 12a and 12b establishes a condition of no interference between them, the converse is not always true. The fact that the bounding boxes 67 associated with the robots 12a and 12b intersect may not give rise to an interference between the robots because each box circumscribes a region larger than the areas $a_1$ and $a_2$ as seen in FIG. 2. For this reason, if the bounding boxes 67 intersect, a closer examination must be made to determine if an interference between the robots 12a and 12b actually exists.

If, during step 68, a determination is made that the bounding box 67 associated with the robot 12a intersects the box associated with the robot 12b, then program execution branches to step 72. During execution of step 72, a check is made whether a polygon 73 (see FIG. 2), which has as its vertices, the tether point 41 of the umbilical cord 40 and the vertices $v_2$, $v_3$, $v_5$ and $v_6$, of the area $a_1$ swept out by the robot 12a, has a "separating" edge. A separating edge is defined as any one of the edges $e_1$, $e_2$, $e_3$, $e_4$ and $e_5$ of the polygon 73 that does not "face" a corresponding polygon (not shown) associated with the robot 12b. An edge of the polygon 73 is said to face the polygon associated with the robot 12b when the edge has an "edge normal" which points in the direction of the other polygon. An edge normal is a unit vector perpendicular to its associated edge and which points away from the center of its polygon. By way of example, in FIG. 2, the edge $e_1$ has as its edge normal a unit vector 74.

Under the laws of geometry, if either of two convex polygons has a separating edge, then the polygons do not intersect. Thus, if either of the polygons 73 associated with the robot 12a and 12b, respectively, has a separating edge, then there will be no interference between the robots. Therefore, if a separating edge is found during step 72, a condition of no interference is reported (step 70). Otherwise, a condition of interference is reported (step 74).

Figure 5:
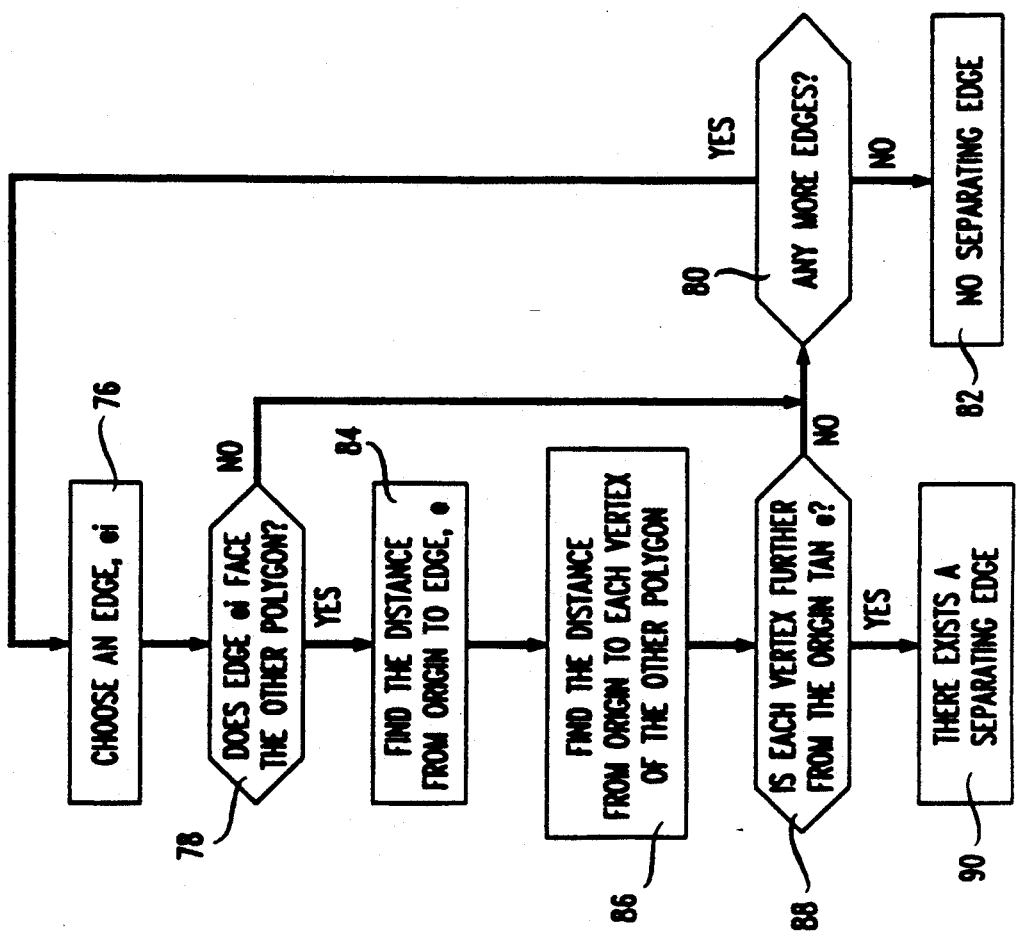
FIG. 5 is a flowchart of a method executed during the method of FIG. 4 to detect the presence of a separating edge of a polygon which represents the area swept out by a separate one of the robots of FIG. 1.

FIG. 5 is a flowchart illustrating the sub-steps executed during step 72 of FIG. 4 to determine if a separating edge exists for the polygon 73 (see FIG. 2) associated with a separate one of the robots 12a and 12b. The first step (step 76) in the method of FIG. 5 is to choose (i.e., designate) an edge $e_i$ of the polygon 73 of FIG. 2 for examination to determine if it is a separating edge. Next step 78 is executed, and a check is made whether the edge designated faces the other polygon (i.e., the polygon associated with the other robot). Should the edge not be a facing edge, then program execution branches to step 80 whereupon a check is made if there are additional edges not yet chosen. If so, then program execution branches back to step 76. Otherwise, if no more edges remain (and all have been found not to be facing edges), then a condition of "no separating edges" is reported (step 82).

If the designated edge $e_i$ is found to be a facing edge during step 78, then program execution branches to step 84, whereupon the distance (d) from the origin, in the direction of the edge normal, is established. Referring now to FIG. 2, if the designated edge is $e_1$ of the polygon 73 of that figure, and the origin is assumed to coincide with the vertex $v_4$, then, the distance measured during step 84 will be given by the distance d shown in the figure.

Following step 84 of FIG. 5, step 86 is executed and the distance between each of the vertices of the polygon associated with the other robot to the origin, along the direction of the edge normal of the edge designated during step 76, is established. Thereafter, a check is made during step 88 whether any of the vertices of the polygon associated with the other lie further from the origin than the designated edge of the polygon 73 to determine whether the designated edge is a separating edge.

To better understand how the distance of each vertex of the polygon associated with the other robot to the origin is determinative of whether the designated edge $e_i$ is a separating edge, assume that the designated edge is $e_1$ of the polygon 73 of FIG. 2 associated with the robot 12a. Further, assume that the vertices $V_{x1}$ and $V_{x2}$ in FIG. 2 are each a separate vertex of the polygon associated with the robot 12b.

Referring to FIG. 2, the distance from the vertex $V_{x1}$ to the origin (the vertex $V_4$), as measured along the unit vector 74, will be given by the distance $d_{vx1}$, which is greater than the distance d. By contrast, the distance from the origin to the vertex $V_{x2}$ (as measured along the vector 74) is given by the distance $d_{vx2}$ which is smaller than d. As may be seen in FIG. 2, because the vertex $V_{x1}$ lies farther from the origin that the edge $e_1$, the vertex $V_{x1}$ lies "in front" of the edge (i.e., outside the polygon 73). Conversely, since the vertex $V_{x2}$ lies closer to the origin than the edge $e_1$, the vertex lies "behind" the edge $e_1$ (i.e., inside the polygon 73). The fact that the vertex $V_{x2}$ lies inside the polygon 73 indicates that the two polygons intersect.

Referring to FIG. 5, if each vertex of the polygon associated with the other robot is found to be further from the origin than the designated edge $e_i$ during step 88, then program execution branches to step 90 whereupon the condition of a separating edge is reported. Otherwise program execution branches to step 80.

The foregoing describes a technique for dynamically controlling the path of each of a pair of robots 12a and 12b by repeatedly checking the likelihood of interference between them as each travels an incremental portion of its preprogrammed path segment. By controlling the movement of the robots so each is allowed to move along its incremental path segment portion in the absence of an interference, much greater efficiency is achieved. No longer must a large area be allocated to a robot to allow it to traverse its entire path segment while delaying the movement of the other robot should its path cross the path of the first one.

It is to be understood that the above-described embodiments are merely illustrative of the principles of the invention. Various modifications and changes may be made thereto by those skilled in the art which will embody the principles of the invention and fall within the spirit and scope thereof. For example, while the invention has been described with respect to dynamically controlling the path of movement of only two robots 12a and 12b, it is equally applicable to controlling multiple robots.

We claim:

1. A method for dynamically controlling the movement of each of a plurality of robots, each programmed to travel at least one path segment at a preselected velocity and acceleration, to avoid an interference with other robots, comprising the steps of:
   (a) independently assigning to each of the robots a priority with respect to an order of movement of said robot relative to the other robots;
   (b) checking the likelihood that each robot, if it traverses a next successive incremental portion of its path segment, will interfere with every other robot;
   (c) enabling each robot which is found not to interfere with any of the others, to traverse the next successive incremental path segment portion; otherwise,
   (d) for each of the robots found likely to interfere with each other, enabling the robot having a priority higher than every other robot to traverse its next successive incremental path segment portion and causing each interfering robot having a lower priority to alter its motion to avoid interfering with said robot having a higher priority; and
   (e) repeatedly executing the steps (a)-(d).

2. The method according to claim 1 wherein the step of checking for the likelihood of an interference comprises the steps of:
   (a) establishing the area that each robot would sweep out were the robot to traverse its next incremental path segment portion;
   (b) creating a polygon to circumscribe the area swept out by each robot; and
   (c) checking whether the polygon associated with each robot intersects the polygon associated with another robot.

3. The method according to claim 1 wherein the length of each successive incremental path segment portion is at least as long as the distance required for the robot to stop plus the distance that the robot would travel during the interval prior to when the likelihood of interference between the robots would be checked again.

4. The method according to claim 1 wherein each lower priority robot, which is found likely to interfere with a higher priority robot, alters its motion to avoid an interference by stopping, if already in motion, so as not to enter a region to be traversed by the higher priority robot; otherwise, if stopped, by moving away from the higher priority robot which is traversing a path segment, a portion of which is already occupied by a lower priority robot.

5. The method according to claim 1 wherein each robot not found to interfere with another is enabled by authorizing the robot to continue moving if already in motion, otherwise, to commence moving if at rest.

6. A method for dynamically controlling the movement of each of a plurality of robots, each energized through an umbilical cord with electrical signals so that each travels at least one rectilinear path segment at a preselected velocity and acceleration, to avoid an interference with other robots, comprising the steps of:
   (a) independently assigning to each of the robots a priority with respect to an order of movement of said robot relative to the other robots;
   (b) checking the likelihood that each robot, if it traverses a next successive incremental portion of its path segment, will interfere with any other robot or with its associated umbilical cord;
   (c) enabling each robot which is found not to interfere, to traverse the next successive incremental path segment portion; otherwise,
   (d) for each of the robots found likely to interfere with another, enabling the robot having a priority higher than each other robot to traverse its next successive incremental path segment portion and causing each interfering robot having a lower priority to alter its motion to avoid interfering with the said robot having a higher priority; and
   (e) repeatedly executing the steps (a)-(d).

7. The method according to claim 6 wherein the step of checking for the likelihood of an interference comprises the steps of:
   (a) establishing the area that each robot and its associated umbilical cord would sweep out were the robot to traverse its next incremental path segment portion;
   (b) creating a polygon to circumscribe the area swept out by each robot and its umbilical cord; and
   (c) checking whether the polygon associated with each robot intersects the polygon associated with another robot.

8. The method according to claim 6 wherein the length of each successive incremental path segment portion is at least as long as the distance required for the robot to stop plus the distance that the robot would travel during the interval prior to when the likelihood of interference between the robots would be checked again.

9. The method according to claim 6 wherein each lower priority robot, which is found likely to interfere with a higher priority robot, alters its motion to avoid an interference by stopping, if already in motion so as not to enter a region to be traversed by the higher priority robot; otherwise, if stopped, by moving away from the higher priority robot which is traversing a path segment, a portion of which is already occupied by a lower priority robot.

10. The method according to claim 6 wherein each robot not found to interfere with another is enabled by authorizing the robot to continue moving if already in motion; otherwise, to commence moving if at rest.

* * * * *